(12) United States Patent
Li

(10) Patent No.: US 9,310,910 B2
(45) Date of Patent: Apr. 12, 2016

(54) TOUCH PANEL WITH ELECTRODE BRIDGING STRUCTURE

(71) Applicant: Yu-Jie Li, Taichung (TW)

(72) Inventor: Yu-Jie Li, Taichung (TW)

(73) Assignee: MIRACLETOUCH TECHNOLOGY INC., Taichung (TW)

( * ) Notice: Subject to any disclaimer, the term of this patent is extended or adjusted under 35 U.S.C. 154(b) by 0 days.

(21) Appl. No.: 14/207,997

(22) Filed: Mar. 13, 2014

(65) Prior Publication Data

US 2014/0285731 A1  Sep. 25, 2014

(30) Foreign Application Priority Data

Mar. 20, 2013  (CN) .......................... 2013 1 0089953

(51) Int. Cl.
G06F 3/041  (2006.01)
G02F 1/1335  (2006.01)
G06F 3/045  (2006.01)

(52) U.S. Cl.
CPC ................ *G06F 3/041* (2013.01); *G06F 3/045* (2013.01)

(58) Field of Classification Search
CPC .................... G06F 3/041; G06F 3/045; G06F 2203/04103; G06F 2203/04113
See application file for complete search history.

(56) References Cited

U.S. PATENT DOCUMENTS 5,457,289 A  * 10/1995 Huang et al. ................ 178/18.08
2011/0273382 A1 * 11/2011 Yoo et al. ...................... 345/173

* cited by examiner

Primary Examiner — Charles Hicks

(57) ABSTRACT

The invention relates to a touch panel with an electrode bridging structure. The touch panel includes an electroconductive substrate and an electroconductive film disposed on the electroconductive substrate. Surfaces of the electroconductive substrate have upper and lower electrodes. The invention is characterized in that at least two electroconductive bridging portions are disposed between the electroconductive substrate and the electroconductive film, and can electrically connect the electroconductive substrate to the electroconductive film. Thus, the upper and lower electrodes of the touch panel can perform the induction conduction through the electroconductive bridging portions, thereby effectively increasing the conduction rate, decreasing the power load of the touch panel and saving the energy.

5 Claims, 7 Drawing Sheets

TOUCH PANEL WITH ELECTRODE BRIDGING STRUCTURE

BACKGROUND OF THE INVENTION

1. Field of the Invention

The invention relates to the technical field of a touch panel, and more particularly to a touch panel with an electrode bridging structure capable of enhancing a conduction rate of the touch panel.

2. Related Art

A five-wire resistive touch panel shown in FIG. 1 is composed of two layers of structures and includes an electroconductive substrate (ITO glass) (10) and an electroconductive film (ITO Film) (20) disposed on the electroconductive substrate (10). The upper surface of the electroconductive substrate (10) is coated with an electroconductive layer (11), and the circumference of the electroconductive substrate (10) is printed with an annular electrode loop (15). Also, a region of the electroconductive substrate (10) corresponding to the circumferential electrode loop (15) is printed with an insulating layer (30). In addition, the lower surface of the electroconductive film (20) is also coated with an electroconductive layer (21), and the circumference of the electroconductive film (20) is printed with silver wires (25) for induction conduction. A region of the electroconductive film (20) corresponding to the circumferential silver wires (25) is printed with another insulating layer (30). There are many fine insulators (35) disposed between the two layers of structures so that the electroconductive substrate (10) and the electroconductive film (20) are kept insulated to ensure the upper and lower structures from being electrically connected to each other to cause the error interpretation when the user does not touch the panel. Furthermore, an insulating adhesive layer (40) is disposed between the two insulating layers (30) of the electroconductive substrate (10) and the electroconductive film (20), so that the electroconductive substrate (10) and the electroconductive film (20) may be adhered together.

When the five-wire type resistive touch panel is operating, the electroconductive layer (11) controls the electrode loop (15) constituted by the four electroconductive wires on the X-axis and the Y-axis, and the upper electroconductive layer (21) is only in charge of the signal feedback. Thus, the measured voltage value and the transmission need to be very precise, or otherwise the accuracy of the coordinate calculation is directly affected. However, the conventional five-wire resistive touch panel utilizes the silver wires (25) disposed on the lower surface of the electroconductive film (20) to perform the transfer, and then collects the silver wires (25) on the corresponding signal connection terminals of the flexible printed circuit board, and the signals are outputted through an electroconductive bridging structure. Because the silver wire (25) has the long length, its transmission sometimes encounters the attenuation problem, thereby disabling its conduction rate from being increased. In order to ensure its conduction rate, the power of the touch panel is usually increased. However, doing so encounters the power consumption phenomenon and tends to rapidly rise the temperature during the operation of the touch panel, thereby damaging the elements and thus shortening its lifetime.

SUMMARY OF THE INVENTION

A main object of the invention is to provide a touch panel with an electrode bridging structure, wherein electroconductive bridging portions of a plurality of connection signal wires are adopted to increase the conduction rate between the upper and lower layers, to decrease the transmission loss, and thus to increase the accuracy of coordinate calculation.

The invention mainly achieves the above-identified object and effect by the following technological means. The invention provides a touch panel including an electroconductive substrate and an electroconductive film disposed on the electroconductive substrate. Opposite surfaces of the electroconductive substrate and the electroconductive film are coated with a transparent electroconductive layer, and a circumference of the electroconductive substrate is printed with an annular electrode loop. Four electroconductive wires are connected to four corners of the electrode loop. Also, a region of the electroconductive substrate corresponding to the circumferential electrode loop is printed with an insulating layer. Furthermore, a space of the electroconductive substrate enclosed by an inner edge of the insulating layer is printed with many fine insulators. In addition, an insulating adhesive layer adheres the insulating layer of the electroconductive substrate to the electroconductive film. The electroconductive substrate has a connection terminal portion, which has electroconductive connection terminals connected to the four electroconductive wires. A middle of the connection terminal portion has a signal connection terminal to be connected to the electroconductive film for induction conduction.

The signal connection terminal of the connection terminal portion is connected to first ends of at least two signal wires, and a second end of each of the signal wires is formed with at least one electroconductive bridging portion, which is longitudinal and has a long axis in parallel with an X-axis or a Y-axis corresponding to an arranged position of the electroconductive bridging portion.

Furthermore, the insulating layer and the adhesive layer are formed with longitudinal through holes corresponding to the electroconductive bridging portions, respectively, so that the electroconductive bridging portions may contact with the transparent electroconductive layer of the electroconductive film.

In addition, the power of the touch panel of the invention can be further decreased to achieve the power-saving and energy-saving effects. Compared with the prior art, the structural layers can be decreased, the manufacturing processes can be decreased, and the working time can be shortened so that the manufacturing cost of the touch panel is decreased.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings.

Figure 1:
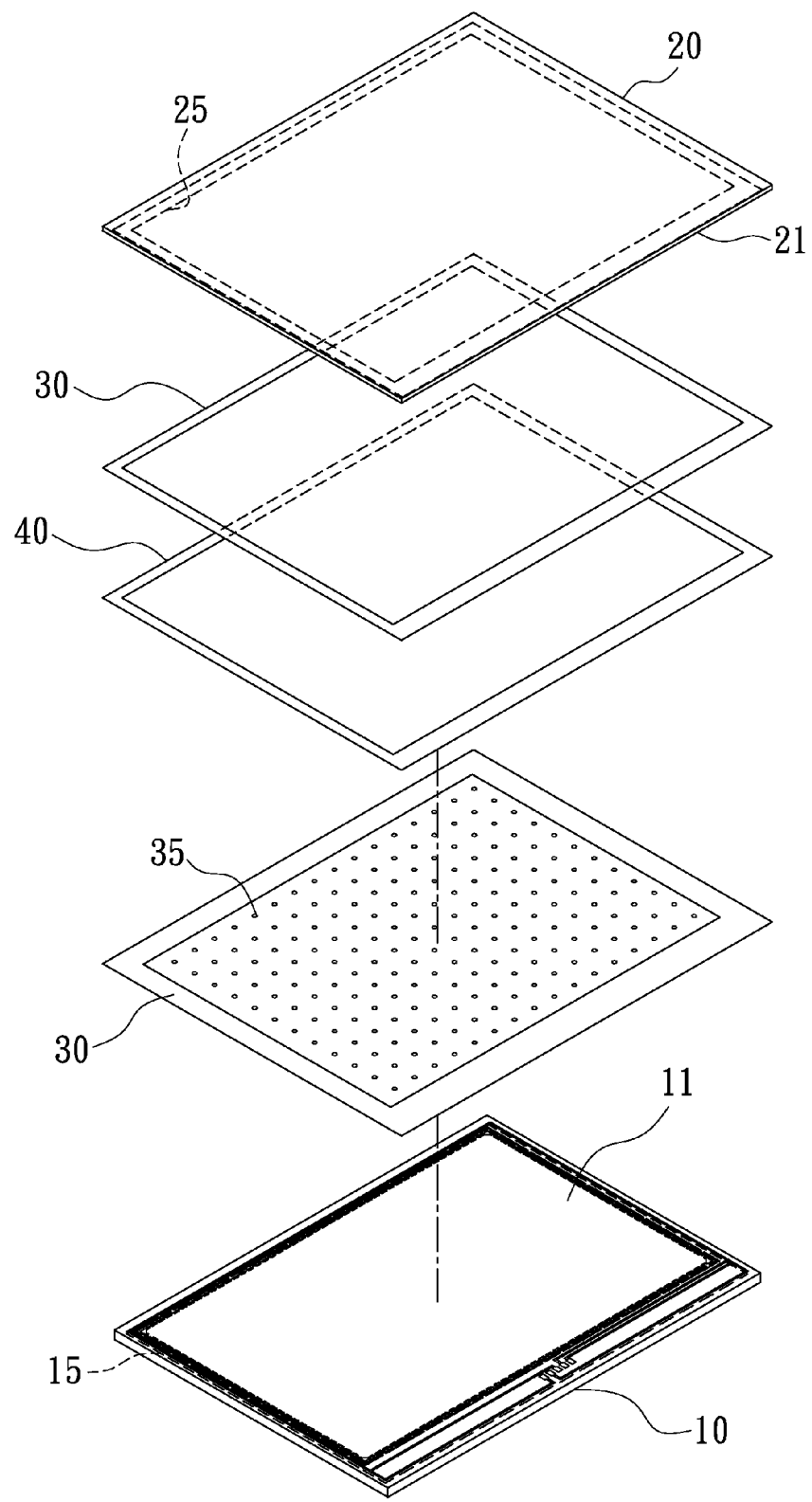
FIG. 1 is a schematic illustration showing the brief architecture of a conventional touch panel.
Figure 2:
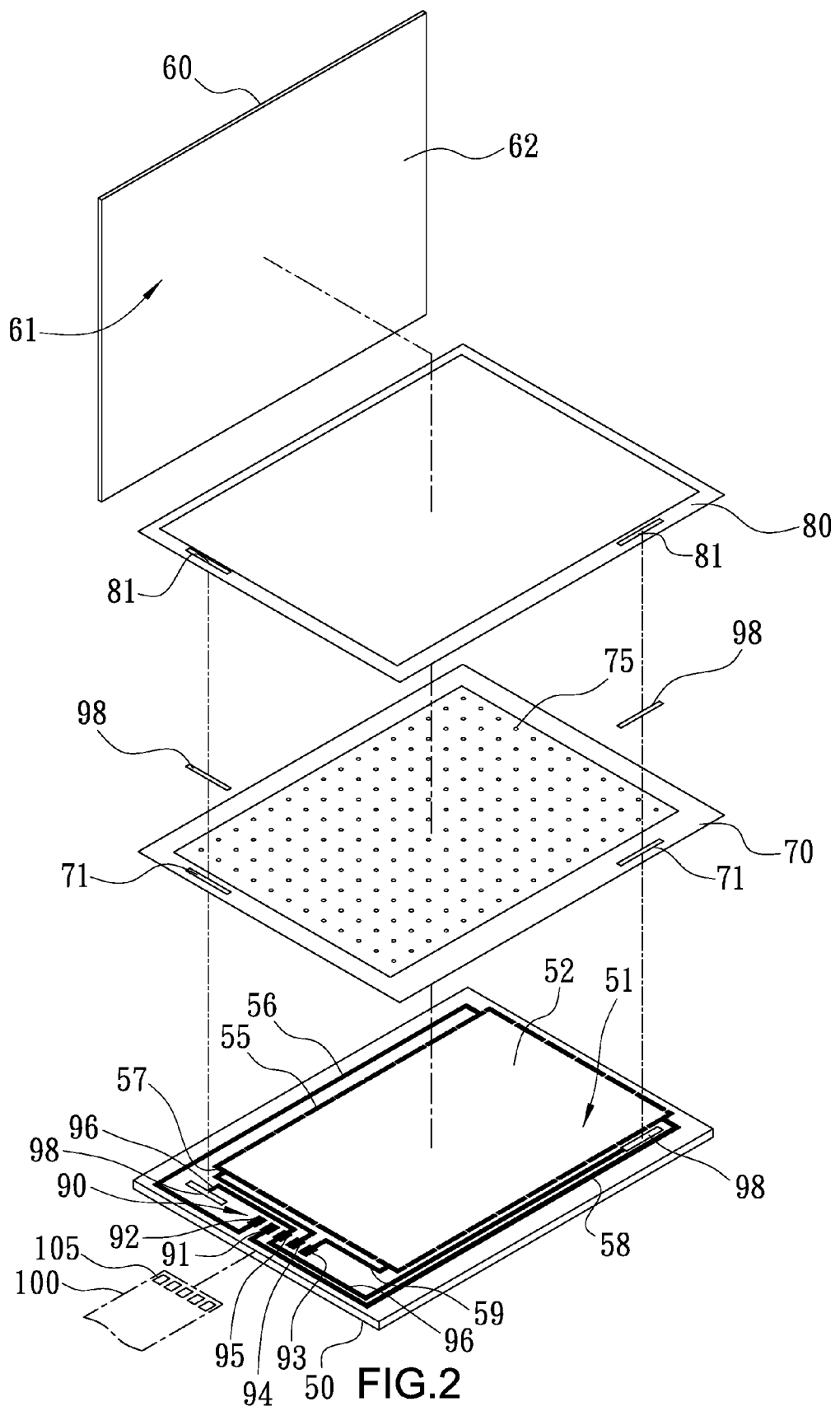
FIG. 2 is a schematic illustration showing the exterior architecture of the electrode bridging structure of the touch panel of the invention.
Figure 3:
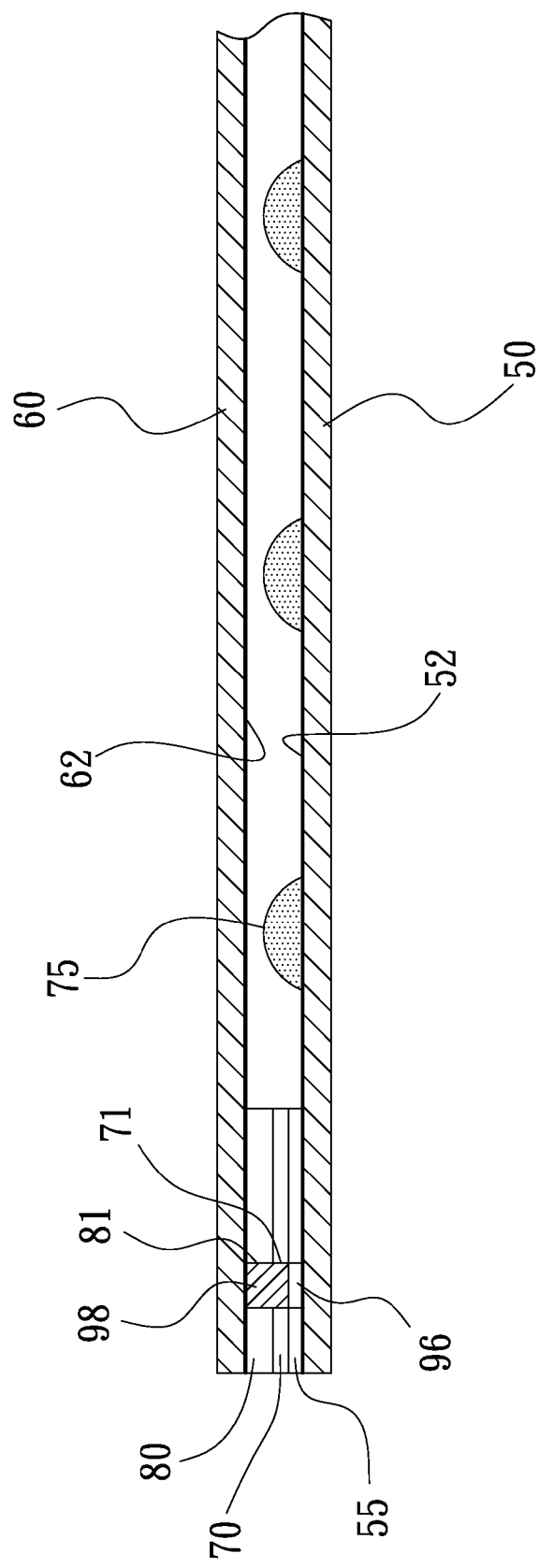
FIG. 3 is a schematically partially cross-sectional view showing the electrode bridging structure of the touch panel of the invention.

The invention provides a five-wire resistive touch panel, as shown in FIGS. 2 and 3. The touch panel includes an electroconductive substrate (ITO glass) (50) and an electroconductive film (ITO film) (60). An upper surface (51) of the electroconductive substrate (50) is coated with a transparent electroconductive layer (52), and a circumference of the electroconductive substrate (50) has an electrode loop (55). Four electroconductive wires (56 to 59) are disposed on the surface of the electroconductive substrate (50) and connected to four corners of the electrode loop (55), respectively. A lower surface (61) of the electroconductive film (60) is also coated with a transparent electroconductive layer (62). A region of the electroconductive substrate (50) corresponding to the circumferential electrode loop (55) is printed with an annular insulating layer (70). Furthermore, a space of the electroconductive substrate (50) enclosed by the inner edge of the insulating layer (70) is printed with many fine transparent insulators (75). Also, an insulating adhesive layer (80) is disposed between the insulating layer (70) of the electroconductive substrate (50) and the electroconductive film (60) (the two layers of structures), so that the electroconductive substrate (50) and the electroconductive film (60) may be adhered together. In addition, a connection terminal portion (90) is disposed on the electroconductive substrate (50). The connection terminal portion (90) has electroconductive connection terminals (91 to 94) connected to the four electroconductive wires (56 to 59) of the electroconductive substrate (50), respectively. A middle of the connection terminal portion (90) has a signal connection terminal (95) to be connected to the electroconductive film (60) to function as the induction conduction for the electroconductive film (60). Furthermore, the connection terminal portion (90) of the touch panel may be electrically connected to a flexible printed circuit board (100) having a corresponding connection terminal portion (105).

Figure 4:
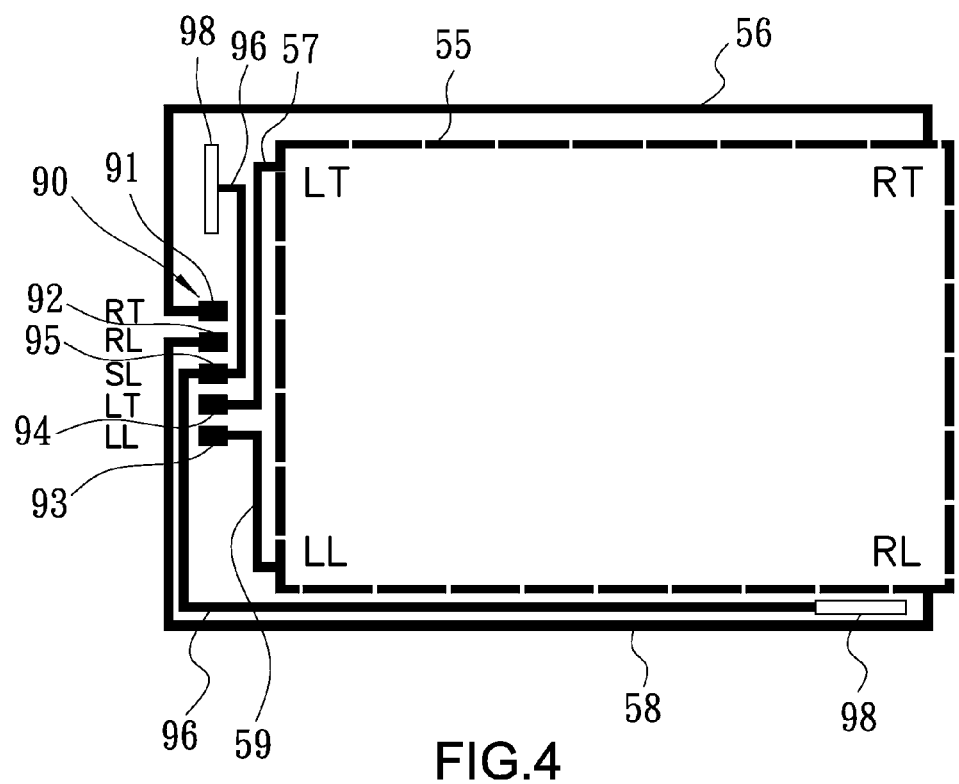
FIGS. 4 to 11 are schematic illustrations showing planar layouts of the electrode bridging structures of the touch panels according to different embodiments of the invention.
Figure 5:
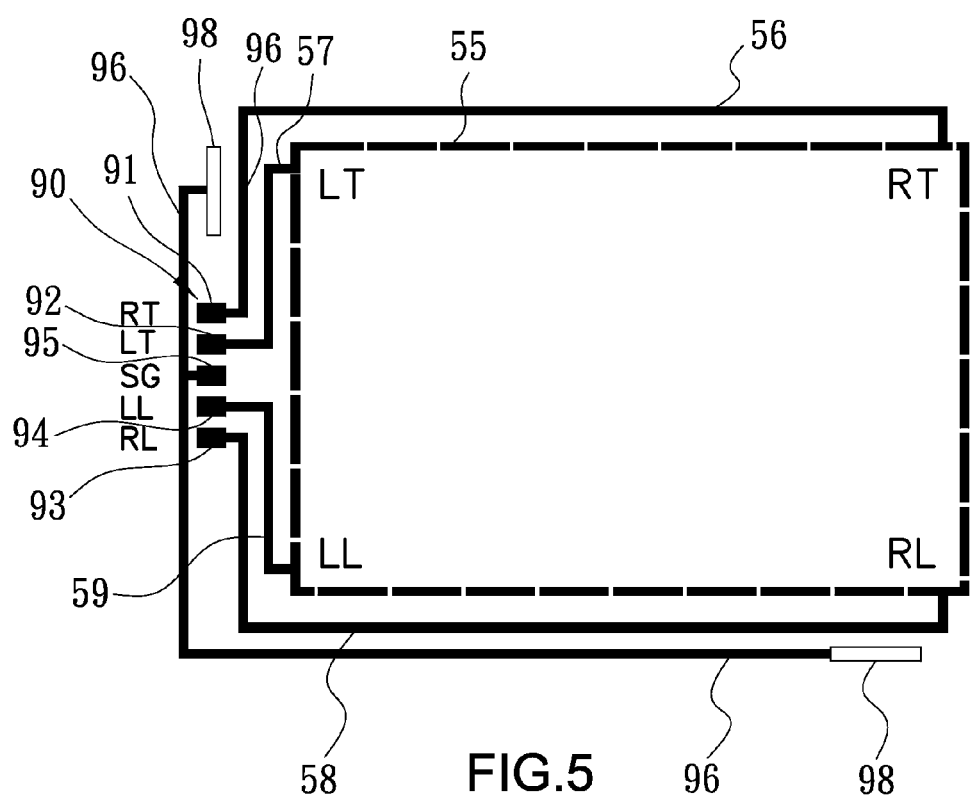
Figure 6:
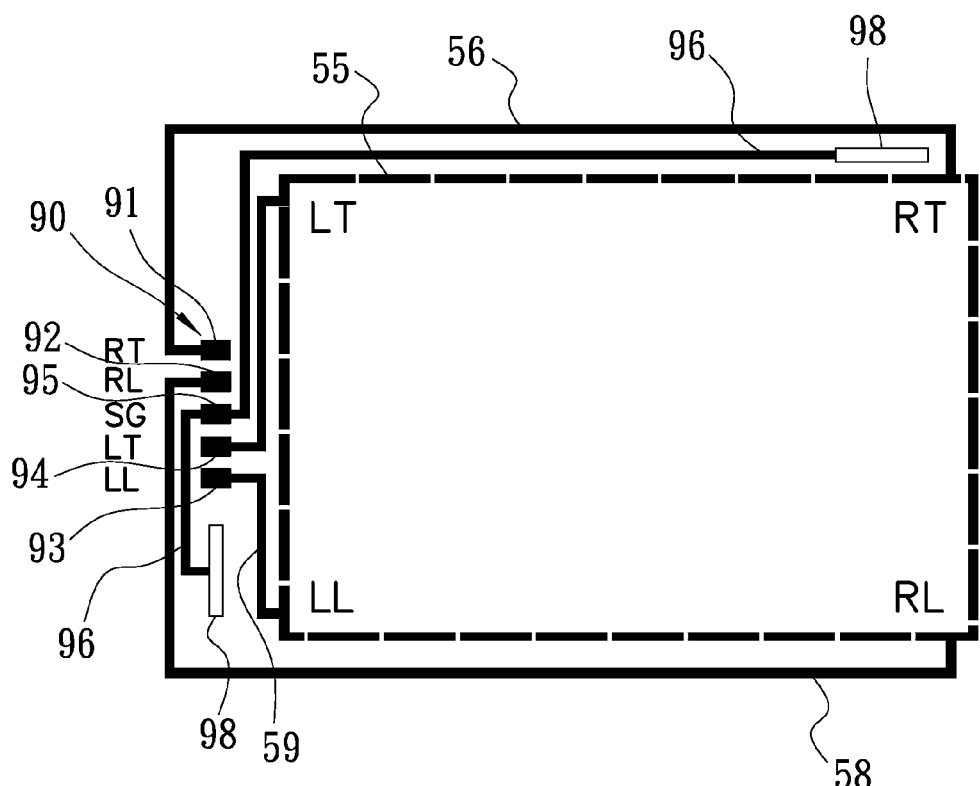
Figure 7:
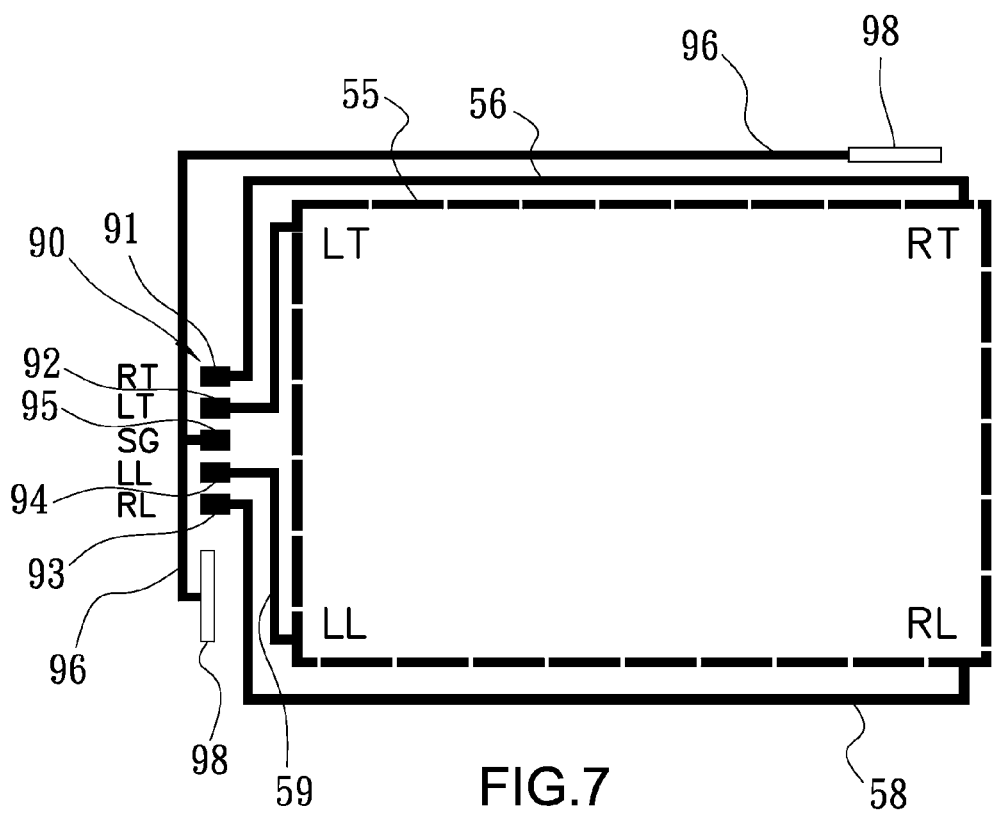
Figure 8:
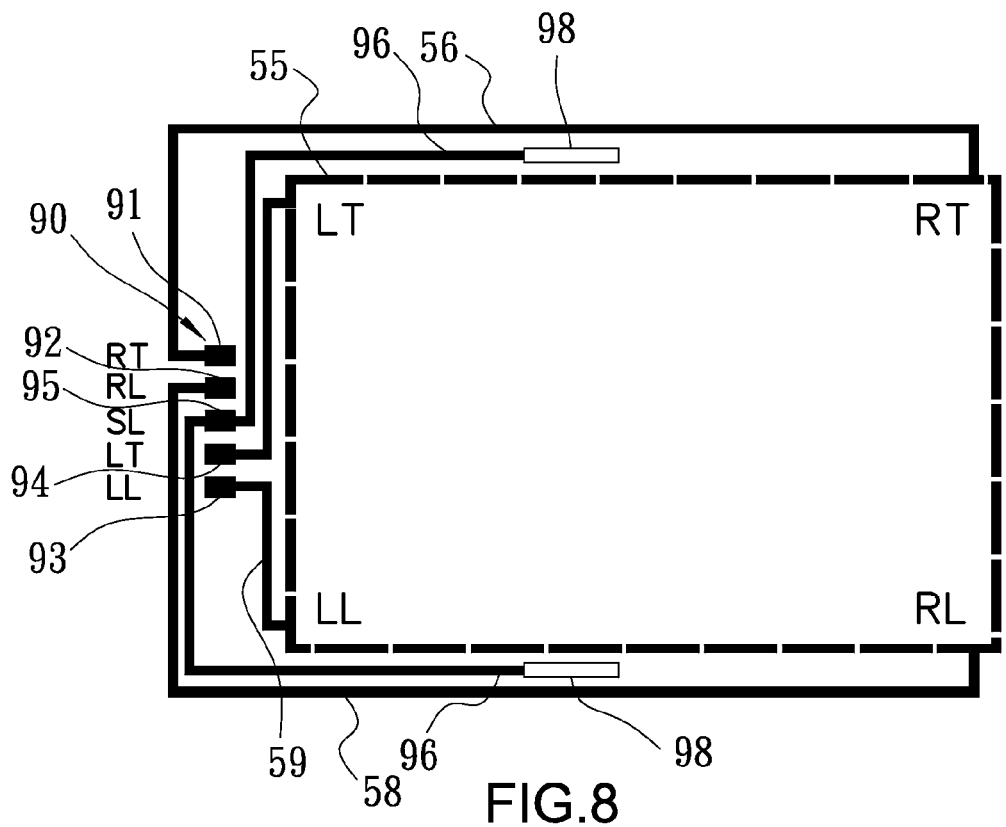
Figure 9:
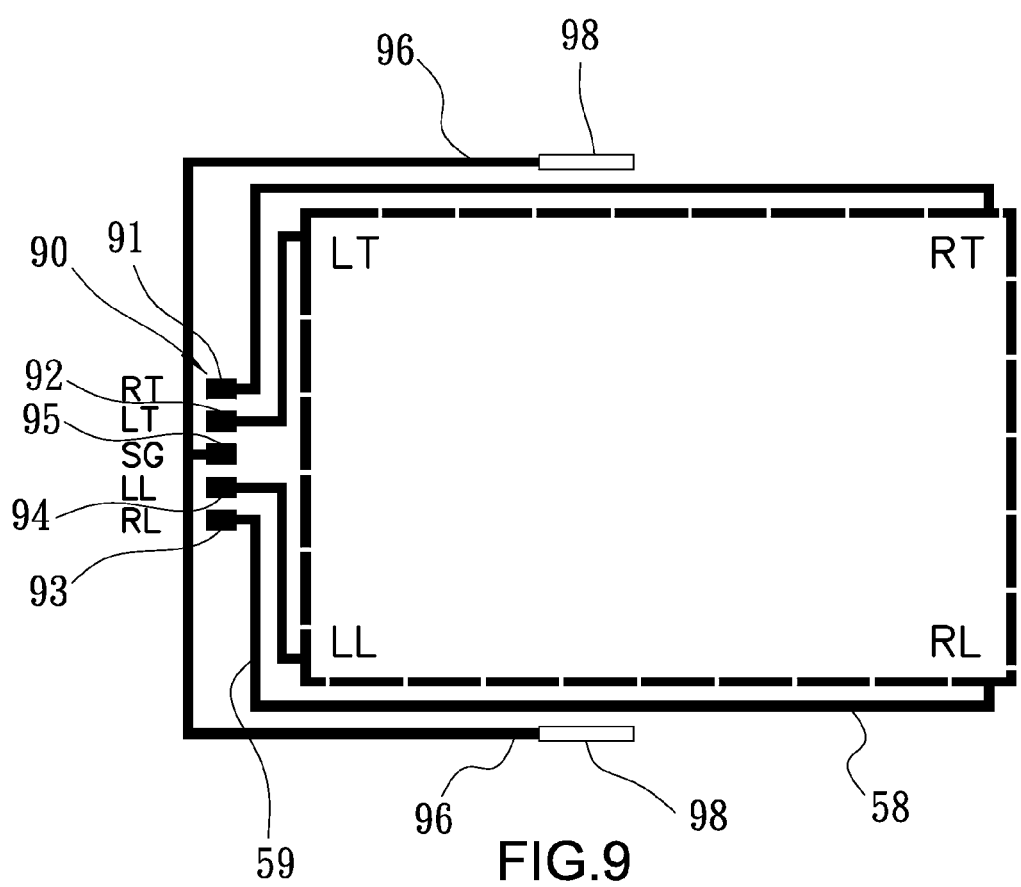
Figure 10:
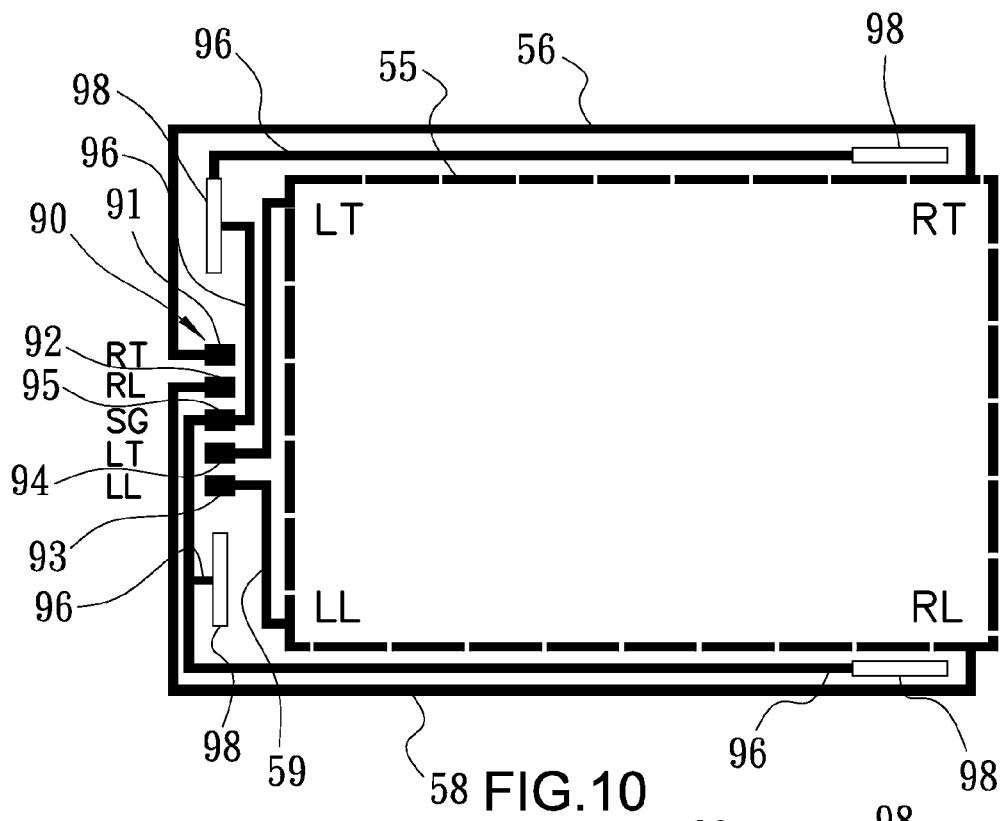
Figure 11:
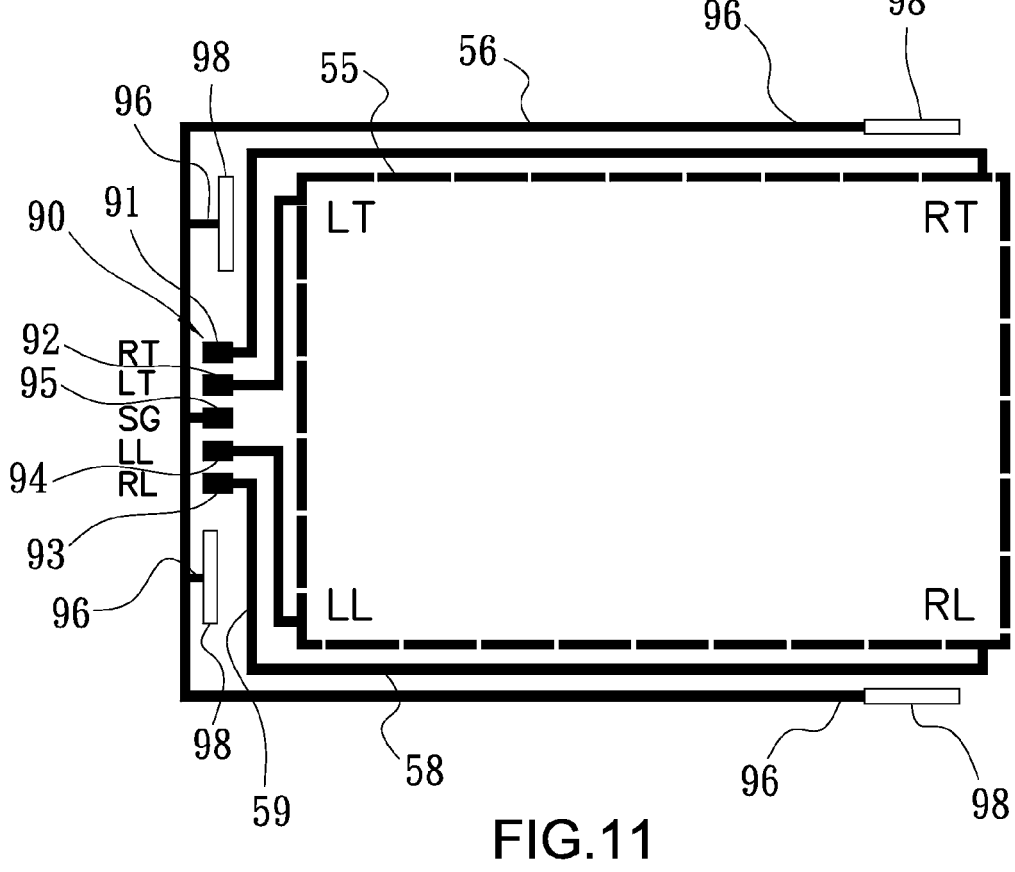

The characteristic structure of the invention will be described in the following. As shown in FIGS. 2 to 4, the signal connection terminal (95) of the connection terminal portion (90) may be connected to first ends of at least two signal wires (96). The second end of each of the signal wires (96) is formed with an electroconductive bridging portion (98), which is longitudinal and has a long axis in parallel with the X-axis or Y-axis corresponding to the arranged position of the electroconductive bridging portion (98). The length of the long axis of each of the electroconductive bridging portions (98) may range from 12 to 25 mm, while the line width of the electroconductive bridging portion (98) ranges from 0.8 to 2 mm. The electrode bridging structure of the invention may have two electroconductive bridging portions (98) (see FIGS. 4 to 9) or four electroconductive bridging portions (98) (see FIGS. 10 and 11), and the electroconductive bridging portions (98) may be disposed on the X-axis side and the Y-axis side corresponding to diagonal corners (see FIGS. 4 to 7, 10 and 11), respectively; and may also be disposed on the middle portions of two opposite parallel axis sides other than the connection terminal portion (90) (see FIGS. 8 and 9). Furthermore, the electroconductive bridging portions (98) may be disposed between the electroconductive wires (56 to 59) (see FIGS. 3, 5, 7 and 9), or disposed outside the electroconductive wires (56 to 59) (see FIGS. 5, 7, 9 and 11).

Furthermore, the insulating layer (70) and the adhesive layer (80) are formed with longitudinal through holes (71, 81) corresponding to the electroconductive bridging portions (98), respectively, so that the electroconductive bridging portions (98) can pass through the insulating layer (70) and the adhesive layer (80) and thus contact with the transparent electroconductive layer (62) of the electroconductive film (60) for the induction conduction and signal transmission.

Thus, a touch panel with an electrode bridging structure capable of increasing the conduction rate and decreasing the power can be constructed.

According to the above-mentioned description, the electroconductive substrate (50) and the electroconductive film (60) of the invention touch panel can perform the induction conduction using the electroconductive bridging portions (98), thereby effectively increasing the conduction rate between the upper and lower layers and decreasing the transmission loss. Thus, in addition to the enhancement of the accuracy of the coordinate calculation, the power of the touch panel is decreased, and the power-saving and energy-saving effects are obtained.

Furthermore, because the electroconductive bridging portions can directly contact with the transparent electroconductive layer (62) of the electroconductive film (60), the processes of disposing the silver wires on the circumference of the electroconductive film (60) can be decreased. Meanwhile, it is unnecessary to additionally dispose the insulating layer for the silver wires. In contract, the structural layers of the touch panel can be indeed decreased so that the touch panel is thin, the processes can be decreased and the working time is shortened. Thus, the manufacturing cost of the touch panel is decreased.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A touch panel comprising an electroconductive substrate coated with a transparent electroconductive layer, an electroconductive film coated with a transparent electroconductive layer, an electrode loop provided on a circumference of the electroconductive substrate, four electroconductive wires connected to four corners of the electrode loop, an insulating layer provided between the electroconductive substrate and the electroconductive film corresponding to the electrode loop, a plurality of insulators enclosed by the insulating layer, an adhesive layer for adhering the electroconductive film to the electroconductive substrate, and a connection comprising four electroconductive connection terminals connected to the electroconductive wires and a signal connection terminal to be connected to the electroconductive film for induction conduction, and the characteristic lies in that:

the touch panel further comprises at least two signal wires each comprising a first end connected to the signal connection terminal of the connection terminal portion and a second end formed with at least one electroconductive bridging portion which is rectangular and has a length in parallel with an X-axis or a Y-axis corresponding to an arranged position of the electroconductive bridging portion and a width perpendicular to the length, wherein the length is in a range of 12 to 25 mm, wherein the width is in a range of 0.8 to 2 mm; and the insulating layer and the adhesive layer are formed with elongated through holes corresponding to the electroconductive bridging portions, respectively, so that the electroconductive bridging portions are in contact with the transparent electroconductive layer of the electroconductive film through the elongated through holes.

2. The touch panel according to claim 1, wherein the electroconductive bridging portions are located opposite to each other.

3. The touch panel according to claim 1, wherein the touch panel comprises four electroconductive bridging portions disposed on the corners, respectively.

4. The touch panel according to claim 1, wherein the two electroconductive bridging portions are disposed on an X-axis side and a Y-axis side corresponding to diagonal corners, respectively.

5. The touch panel according to claim 1, wherein the two electroconductive bridging portions are disposed on middle portions of two opposite parallel axis sides other than the connection terminal portion.

* * * * *